E. TOOLE.
RIM COLLAPSING DEVICE.
APPLICATION FILED OCT. 19, 1916.

1,291,265.

Patented Jan. 14, 1919.
2 SHEETS—SHEET 1.

Inventor—
Edward Toole.
by his Attorneys
Howson & Howson

E. TOOLE.
RIM COLLAPSING DEVICE.
APPLICATION FILED OCT. 19, 1916.
1,291,265.
Patented Jan. 14, 1919.
2 SHEETS—SHEET 2.
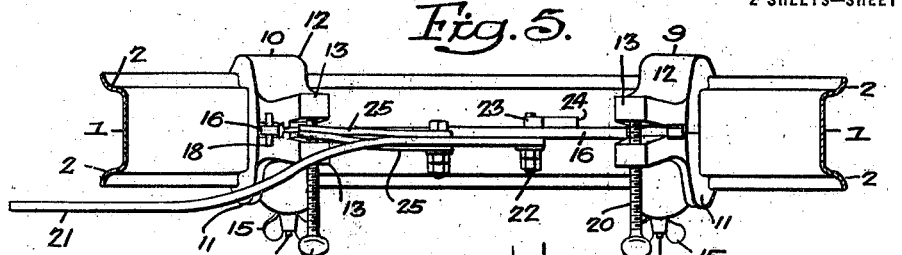
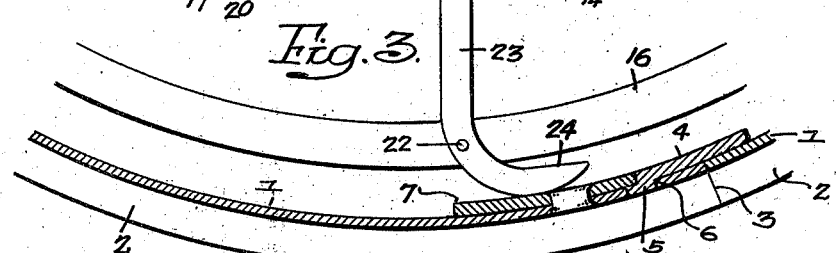
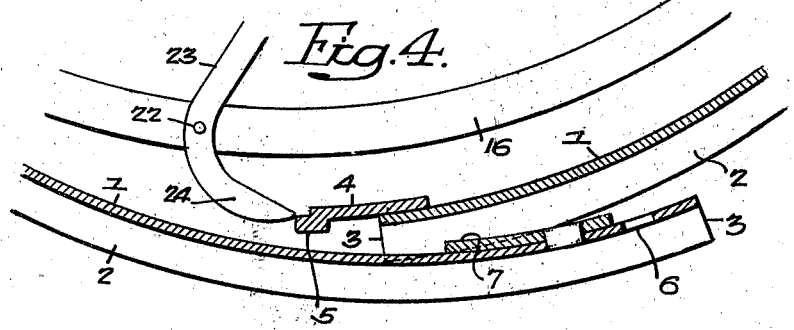
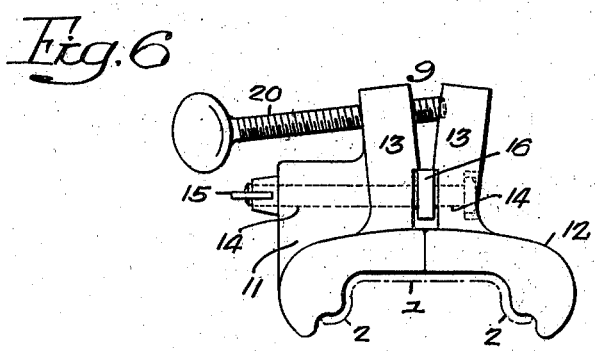
Inventor—
Edward Toole,
by his Attorneys:
Howson & Howson

UNITED STATES PATENT OFFICE.

EDWARD TOOLE, OF GLOUCESTER, NEW JERSEY, ASSIGNOR OF ONE-HALF TO EDWARD H. McLENNAN, OF GLOUCESTER, NEW JERSEY.

RIM-COLLAPSING DEVICE.

1,291,265.     Specification of Letters Patent.     Patented Jan. 14, 1919.

Application filed October 19, 1916. Serial No. 126,535.

*To all whom it may concern:*

Be it known that I, EDWARD TOOLE, a citizen of the United States, residing at Gloucester, Camden county, New Jersey, have invented Rim-Collapsing Devices, of which the following is a specification.

One serious cause of delay and trouble in the use of demountable rims has been due to the difficulty of placing a tire shoe upon and removing it from the same, since it is either necessary to force the shoe over the side flange of the rim or to forcibly collapse the latter and this latter procedure has been found to be particularly difficult and tedious.

One object of my invention therefore is to provide a relatively simple, inexpensive and quickly applied device which may be easily operated to so far collapse a rim that a tire shoe may be instantly put in place thereon;—the invention contemplating an arrangement of parts whereby said rim may be forcibly returned to its original position and made ready for use.

I further desire to provide a rim collapsing device which in addition to including means whereby the abutting ends of said rim may be made to forcibly overlap, shall include an attachment for primarily moving said ends out of alinement, the construction being such that the device may be quickly and easily adjusted to suit it for use on rims of different dimensions.

These objects and other advantageous ends I attain as hereinafter set forth, reference being had to the accompanying drawings, in which, Figure 1 is a side elevation showing my device as applied to a demountable rim with its parts in positions ready for use to collapse or overlap the ends of said rim;

Figs. 3 and 4 are enlarged fragmentary elevations showing the use of the attachment for moving the abutting ends of the rim out of alinement prior to the operation of the collapsing device;

Fig. 5 is a plan partly in section further illustrating the apparatus; and

Fig. 6 is an end elevation of one of the clamps.

Figure 1:
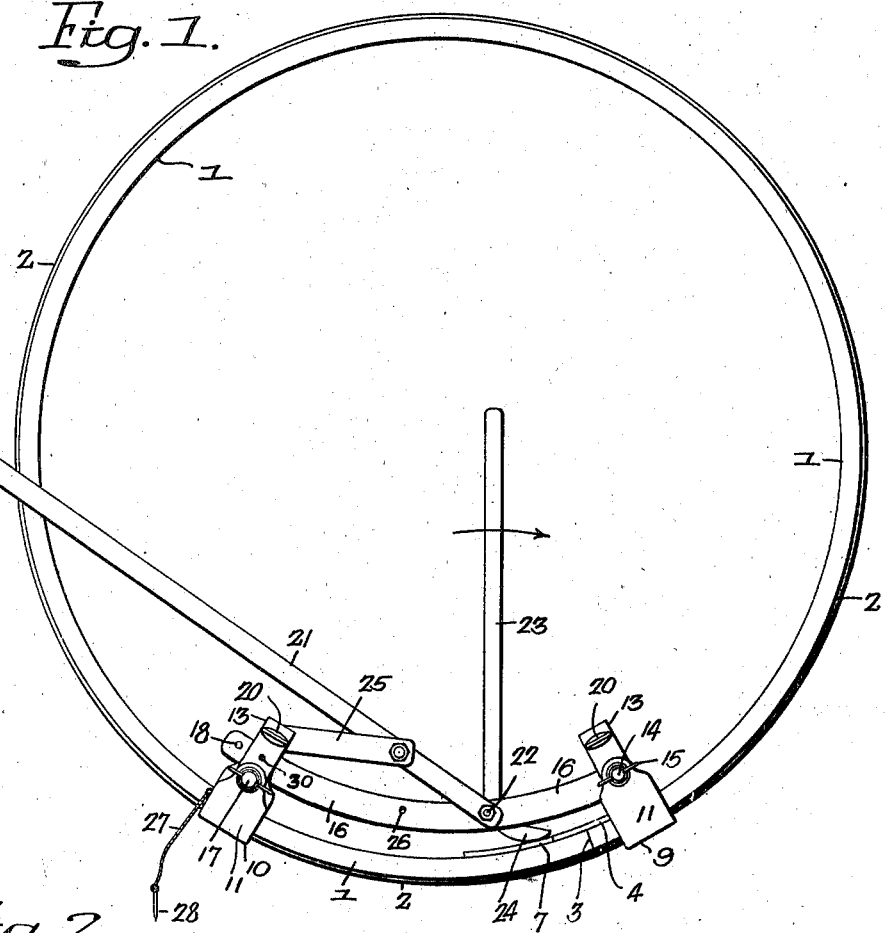

In the above drawings, 1 represents a demountable rim having side flanges 2 and split so that it has two ends which abut in a substantially radial plane at 3, although they may be abutted in any other desired manner without departing from my invention. For normally maintaining said ends in line, one of them has welded or otherwise rigidly fixed to its inner face a strap or plate 4 projecting beyond its end and offset outwardly to form a head 5 designed to fit into a correspondingly formed recess or opening 6 in the other end. This latter end of the rim has pivoted to its inside surface a retaining plate 7 constituting a latch which when so turned as to extend longitudinally of the inside rim surface, will prevent the moving of the two abutting rim ends out of alinement. Said latch may however be turned on its pivot so as to lie transversely of the rim and thereby release the head 5 which may then be withdrawn from engagement with the second rim end.

For manipulating a demountable rim such as above described, I provide a pair of clamps 9 and 10 recessed to more or less closely fit the inside surface of the rim. Each of these clamps consists of a pair of castings 11 and 12 each formed of a body portion and a projecting arm 13;—the construction being such that while the body portions of the clamp coöperate to constitute rim engaging structures, the two arms of each clamp project therefrom toward the center of the rim substantially parallel with each other, and are loosely connected by a fulcrum bolt 14 having a thumb nut 15. This bolt extends through suitable recesses in said arms at points immediately adjacent the body portions of the clamps, and in the clamp 9 also passes through one end of a bar 16.

In the case of the clamp 10, while the adjacent faces of its arms 13 are recessed to receive and slidably guide said bar 16, the latter is not positively engaged by the fulcrum bolt 17 of this clamp. The free end of the bar 16, after passing between the arms 13 of the second clamp 10, has mounted in it a transverse pin or stop designed to prevent its complete withdrawal from said clamp. It is noted that the fulcrum bolt 14 in each case is preferably of such length as to permit of more or less separation of the arms as well as of the body portions of the clamp so that this may be adapted for use on rims of different dimensions.

The outer portion of one arm 13 of each clamp has threaded in it a thumb screw 20 abutting upon the adjacent face of the second arm of the same clamp and it is to be noted that the fulcrum bolts 14 and 17 pass through their respective clamps more or less loosely, so that as the thumb screws 20 are set up, the clamp sections are fulcrumed on said bolts to permit the outer portions of their bodies to grip the flanges, etc., of the rim.

The bar 16 which is preferably circularly curved, has pivoted or fulcrumed to it a relatively long lever 21 at a point which, while it may be widely varied without departing from my invention, is preferably about one-third the distance from the bolt 14 of the clamp 9 to the pin or stop 18, and the pivot bolt 22 whereby this connection is made also has pivotally mounted upon it a second lever 23. The latter is formed with a foot portion 24 projecting at right angles to its main part so as to be capable of being brought into engagement with that one of the rim ends which carries the latch 7.

The longer or collapsing lever 21 is connected by a pair of links 25 to the clamp 10, for which purpose, one end of said pair of links is pivotally engaged by the thumb screw 20 of said clamp. The bar 16 is preferably provided with a hole 26 placed at a point between the fulcrum pin 22 and the stop pin 18, and by means of a short length of chain 27, I permanently connect a locking pin 28 to the clamp 10, the arrangement being such that said pin may be inserted in the hole 26.

With this arrangement of parts, when it is desired to collapse the rim in order to remove a tire from it or put it in condition to receive a tire, the clamps 9 and 10 are applied in the positions shown in Fig. 1, the first being fixed to it immediately adjacent the end of the plate 4 by setting up the thumb screw 20 after said clamp has been loosely fitted to the rim by adjustment of the fulcrum bolt 14.

The bar 16, being curved substantially concentric with the rim, is free to slide through the second clamp 10, and this clamp has its thumb screw set up to cause it to grip said rim at a point as far as possible from the clamp 9. After the latch 7 has been turned on its pivot so as to disengage the head of the plate 4, the shorter or displacing lever 23 is forcibly turned in the direction of the arrow so that its foot portion 24 engages the adjacent part of the rim, springing it outwardly until it is free of the head 5, whereupon its natural resiliency causes it to overlap the other end of the rim as shown in Fig. 4.

Figure 2:
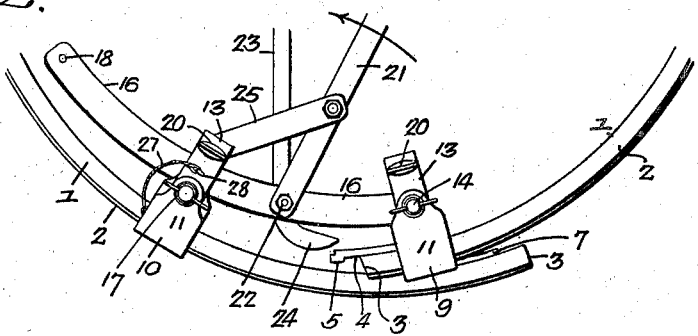
Fig. 2 is an elevation similar to Fig. 1, showing the device with its parts in the positions occupied after the rim has been collapsed.

The collapsing lever 21 is then moved from the position shown in Fig. 1 to that illustrated in Fig. 2, so that through the link 25, it forcibly moves the clamp 10 toward the clamp 9. During this operation the bar 16 slides through said clamp and the rim is collapsed to a considerably reduced diameter, owing to the forced overlap of its two ends. Thereafter it is then retained in this collapsed position by the insertion of the pin 28 in the hole 26 back of the clamp 10.

Owing to this reduction in the diameter of the rim, it is now possible to easily place upon it the tire shoe which it was designed to receive, after which the pin 28 may be removed and the rim expanded to its original dimensions by moving the lever 21 in the direction of the arrow, Fig. 2. When the ends of the rim are thus brought into practically the same plane the head 5 springs into the recess 6, whereupon the lever 21 may be released and the whole apparatus removed by slacking off the thumb screws 20. The latch 7 is then turned from its position transversely of the rim to one in which it extends longitudinally of the inside curved rim surface, thus locking the ends in their abutting position.

From the above description it will be understood that my device makes it possible to quickly and certainly so collapse or reduce the diameter of a demountable rim as to permit of the easy placing upon it of a tire shoe.

Similarly it makes possible the forcible expansion of the rim to its original dimensions and that with the expenditure of a minimum of time and labor. Not only is the device itself relatively simple in construction and of such a nature as to be cheaply and inexpensively manufactured, but its various parts are so designed as to facilitate its easy and quick application to a rim as well as its convenient manipulation when the latter is to be expanded or collapsed.

If desired I may provide a hole 30 in the arms of the clamp 10 and place the pin 28 therein so that its inner end rests against the side of the bar 16 prior to the beginning of the collapsing operation. Thereafter when by the operation of the lever 21 the rim ends have been caused to overlap to the desired extent, the hole 26 in said bar comes under the pin which then drops into it and retains the parts of the device with the rim in its collapsed condition.

I claim:—

1. A rim collapsing device consisting of two rim engaging clamps; a bar extending between said clamps and slidably guided by one of them; with a collapsing lever fulcrumed on said bar and linked to one of the clamps.

2. A rim collapsing device consisting of two clamps for connection to the rim ends respectively; a bar connected to one of the clamps and slidable through the other; a lever fulcrumed on said bar adjacent one of the clamps; a link connecting said lever to the second clamp; with a second lever carried by said bar in position to displace one of the ends of the rim from alinement with the other end.

3. A rim collapsing device consisting of a pair of structures for attachment to the ends of a rim respectively; a bar connected to one of said structures; a collapsing lever and a rim-end displacing lever both fulcrumed to said bar at a common point; with means for attaching one of the levers to the second tire engaging structure.

4. A rim collapsing device consisting of a pair of structures for attachment to the ends of a rim respectively; a bar connected to one of said structures and in slidable engagement with the other; two levers fulcrumed to said bar at a common point; with means for attaching one of the levers to the second tire engaging structure; the second lever having an arm extended into position to engage one of the rim ends so as to be capable of moving it out of alinement with the other.

EDWARD TOOLE.